(No Model.)

J. B. WARNER.

TEA KETTLE AND BAIL.

No. 262,865. Patented Aug. 15, 1882.

WITNESSES:
C. Neveux
C. Sedgwick

INVENTOR:
J. B. Warner

BY Munn & Co
ATTORNEYS.

UNITED STATES PATENT OFFICE.

JOSEPH B. WARNER, OF DIGHTON, MASSACHUSETTS.

TEA-KETTLE AND BAIL.

SPECIFICATION forming part of Letters Patent No. 262,865, dated August 15, 1882.

Application filed July 6, 1882. (No model.)

*To all whom it may concern:*

Be it known that I, JOSEPH B. WARNER, of Dighton, Bristol county, Massachusetts, have invented a new and Improved Tea-Kettle and Bail, of which the following is a full, clear, and exact description.

The object of my invention is to provide a new and improved tea-kettle in which the bail can be readily locked in the raised or lowered position.

The invention consists in a tea-kettle provided with a front ear or lug having an aperture and a downwardly-projecting slot, and with a rear ear having an aperture and an upwardly-projecting slot, combined with a bail having the hook ends squared or flattened, whereby the bail can be locked in position when raised or lowered.

Reference is to be had to the accompanying drawings, in which similar letters of reference indicate corresponding parts in both figures.

Figure 1:
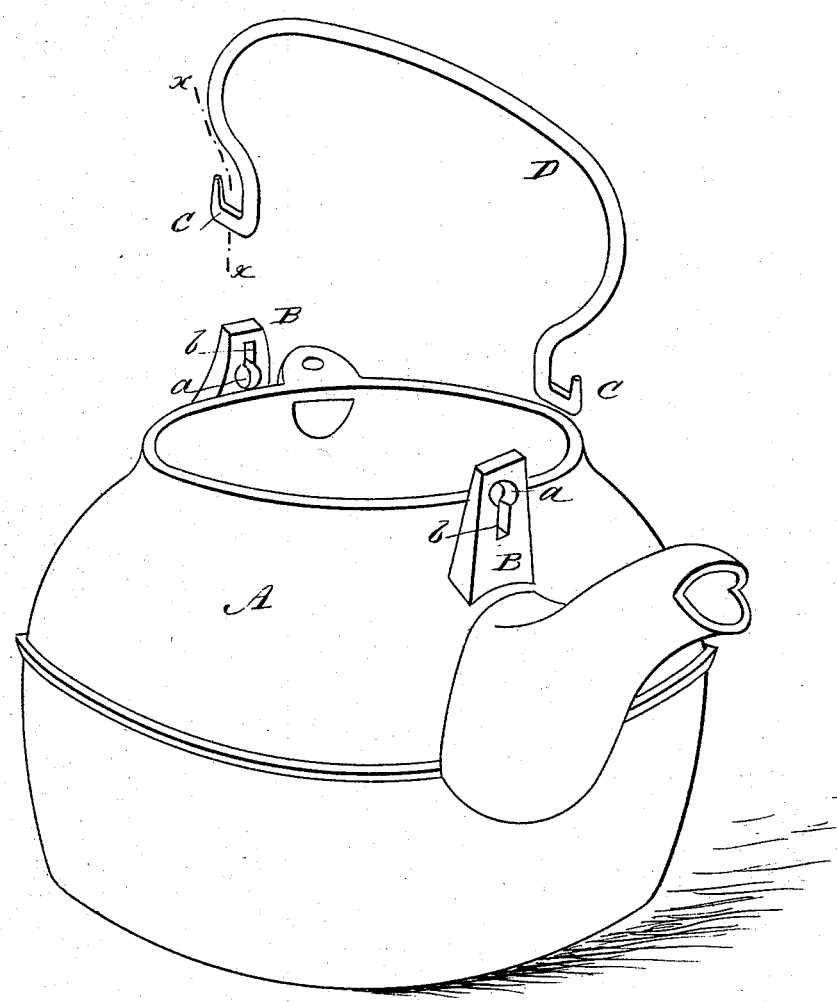
Figure 2:

Figure 1 is a perspective view of my improved tea-kettle, showing the bail detached; and Fig. 2 is a cross-sectional elevation of the end of the bail on the line $x\ x$, Fig. 1.

The tea-kettle A is provided with a lug or ear, B, above the rear or inner end of the spout, and with a like ear or lug, B, at the opposite side of the opening that is on the rear part of the kettle. The front lug or ear B is provided with a circular aperture, $a$, from which a slot, $b$, extends downward, and the rear ear or lug B is provided with a circular aperture, $a$, from which a slot, $b$, extends upward.

The hooks C at the ends of the bail D are flattened or squared, so that they can pass into the slots $b$, and these hooks are passed through the apertures $a$ of the lugs or ears B.

If the bail D is to be folded down on the kettle, the front hook is raised into the aperture $a$ of the front ear and the rear hook of the bail is lowered into the aperture $a$ of the rear ear. Then the bail can swing. If the bail is to stand erect or upward, the front hook C of the bail is lowered into the slot $b$ of the front ear. Then the bail will be held in position and cannot be turned down.

If the rear end of the kettle is to be raised to pour the contents of the kettle out of the spout, the hooks C will automatically pass into the slots described, and thus the bail will be held firmly in position and cannot swing, and the kettle cannot swing or tilt sidewise, and the danger of pouring the boiling contents of the kettle over the person by accidental swinging or tilting of the kettle is completely avoided.

Having thus described my invention, I claim as new and desire to secure by Letters Patent—

1. A tea-kettle made, substantially as herein shown and described, with a front and rear bail, lug, or ear, the front ear being provided with a circular aperture and a downwardly-projecting slot, and the rear ear being provided with a circular aperture and an upwardly-projecting slot, substantially as herein shown and described, and for the purpose set forth.

2. The combination, with a kettle provided with a front ear having a circular aperture and a downwardly-projecting slot and a rear ear having a circular aperture and an upwardly-projecting slot, of a bail having the hook ends flattened or squared, substantially as herein shown and described, and for the purpose set forth.

JOSEPH BUTTRICK WARNER.

Witnesses:
R. E. WARNER,
E. E. PIERCE.